United States Patent [19]

Berliner

[11] Patent Number: 6,125,403
[45] Date of Patent: Sep. 26, 2000

[54] METHOD FOR IMPLEMENTING A NON-VOLATILE CACHING PRODUCT FOR NETWORKS AND CD-ROMS

[75] Inventor: Brian Berliner, Colorado Springs, Colo.

[73] Assignee: Sun Microsystems, Inc., Palo Alto, Calif.

[21] Appl. No.: 08/641,654

[22] Filed: May 1, 1996

[51] Int. Cl.[7] .............................. G06F 9/00; G06F 9/46; G06F 15/163

[52] U.S. Cl. .......................................................... 709/324

[58] Field of Search ................................... 395/681, 617, 395/821; 709/300–305, 310–332; 707/201; 710/1

[56] References Cited

U.S. PATENT DOCUMENTS

| | | |
|---|---|---|
| 5,359,713 | 10/1994 | Moran et al. . |
| 5,414,848 | 5/1995 | Sandage et al. . |
| 5,721,916 | 2/1998 | Pardikar ................................. 395/617 |
| 5,752,005 | 5/1998 | Jones ..................................... 395/500 |
| 5,884,093 | 3/1999 | Berenguel . |

FOREIGN PATENT DOCUMENTS

| | | |
|---|---|---|
| 0 667 579 | 8/1995 | European Pat. Off. . |
| 0 713 183 | 5/1996 | European Pat. Off. . |
| WO 95/24685 | 9/1995 | WIPO . |

OTHER PUBLICATIONS

Oney, Walter; "Extend ypur Application with dynamically loaded VxDs under Windows 95", MSDN Library, pp. 1–29, May 1995.

Custer, Helen Design and Implementation details of the Windows NT virtual block manager, MSDN Library, pp. 1–23, Jul. 1995.

Asche, Ruediger; "The Little Device Driver Writer", MSDN Library, pp. 1–26, Feb. 1994.

King, Adrian; Inside Windows 95, Chapter 7, pp. 275–308, 1994.

Rawn Shan, "Networking with Windows 95 part 2", Sun-World Online, Dec. 1995.

Dr. Dobb's Journal, vol. 20, No. 12, Dec. 1995, U.S., pp. 62, 64, 66, 68–70, 108–10, Russinovitch M., et al., Examining the Windows 95 Layered File System.

*Primary Examiner*—Majid A. Banankhah
*Assistant Examiner*—P. G. Caldwell
*Attorney, Agent, or Firm*—Holland & Hart LLP

[57] ABSTRACT

A network and CD-ROM caching product that runs under both Windows 3.X and Windows 95, is completely transparent to end-users, and works with a wide variety of file systems running under both Windows 3.X and Windows 95 is disclosed. The approach used to fulfill these requirements has been to utilize the services provided by a virtual device driver (VxD) supplied with Windows 95 known as the Installable File System Manager (IFSMGR). Windows 95 is designed so that all file system input/output (I/O) requests may be "hooked" to the IFSMGR VxD. The disclosed caching product is effectively "layered" between the IFSMGR VxD and the generic file system of Windows 95. The disclosed caching product has been designed so that it will run under both operating systems. This has been accomplished by rewriting portions of the Windows 95 IFSMGR VxD, enabling it to run under Windows 3.X. The rewritten version is based on the IFSMGR specification provided by Microsoft Corporation.

17 Claims, 2 Drawing Sheets

METHOD FOR IMPLEMENTING A NON-VOLATILE CACHING PRODUCT FOR NETWORKS AND CD-ROMS

This application is related to U.S. application Ser. No. 08/640,970 filed on Apr. 1, 1996; to U.S. application Ser. No. 08/641,653 filed on May 1, 1996; to U.S. application Ser. No. 08/640,527 filed on May 1, 1996; to U.S. application Ser. No. 08/641,523 filed on May 1, 1996; and to U.S. application Ser. No. 08/639,531 filed on May 1, 1996, all assigned to Sun Microsystems, Inc., assignee of the present invention, the disclosures of which are herein incorporated by this reference.

BACKGROUND OF THE INVENTION

1. Field of the Invention

This invention relates to non-volatile caching systems for data processing systems, and methods for implementing such systems.

2. Description of Related Art

Caching has long been employed to increase performance of a relatively slow computer memory resource when a faster memory resource, which typically has a higher cost per stored bit, is available. Typically, a temporary memory block within the faster memory resource (i.e., a cache) is established for storing only a portion of the information stored within the slower memory resource. Rather than store within the faster memory resource an entire application program or an entire data file that may be resident on the slower memory resource, certain algorithms are employed to determine which portions of the program or data file are most likely to be accessed. When the system's central processing unit (CPU) calls a memory location that is not stored in the cache, the cache (if completely filled) must be at least partially overwritten with the required data from the slower memory resource. Likewise, when permanent changes are made to data, data in both the cache and the slower memory resource must be updated to reflect that change.

As this is written, there are roughly 150 million computers throughout the world capable of performing general business-related tasks. When the rapid proliferation of personal computers began in the early 1980s, nearly all of them were employed as stand-alone units. However, multi-user systems were soon developed. These early multi-user systems ran software written for the CP/M disk operating system, which had been written by Gary Kildall and was marketed by his company, Digital Research, Inc. The multi-user disk operating system MP/M supplied by Digital Research, Inc. connected several "dumb" terminals to a single microprocessor and a shared disk drive, while TurboDOS—a much more sophisticated product supplied by an unrelated company—utilized a master/slave arrangement much like the Local Area Networks (LANs) in use today.

Both the MP/M and the TurboDOS disk operating systems ran on computer systems based on either the Intel 8080 microprocessor or the Zilog Z-80 microprocessor. Neither of these early microprocessors could directly address more than 65,536 bytes of random-access memory. As a consequence of MP/M and TurboDOS requiring a minimum of about 50,000 bytes of random access memory, only about 15,000 bytes of addressable memory remained for application programs. As few application programs, other than simple word processors, required 15,000 bytes or less, the early multi-user systems were, for the most part, more intellectual curiosities than they were practical, general-use, multi-user data processing systems.

Distributed data processing (i.e., multiple LANs interconnected via a long-distance data link) using either MP/M or TurboDOS was even more hopeless, as it would have required loading a communication program into memory, in addition to the operating system, before application software could be loaded. However, with the introduction of IBM-compatible computers based on the Intel 80286 microprocessor, which was designed to address several megabytes of random-access memory, the development of practical LANs and distributed data processing systems became feasible. Although Novel Corporation initially captured a majority share of the LAN market, the number of networks utilizing LAN software from Microsoft Corp. has been growing.

Present-day LANs generally use a twisted wire pair or a coaxial cable to interconnect individual user computer systems to a server system. The interconnection of LANs is accomplished via telephone lines, special dedicated data lines, microwave, or satellite links. Acoustic links can be made using electrically-conductive or fiber-optic cables. For acoustic links, each end of the link generally requires a modem. The other links typically utilize a "bridge" and a "router" at each end.

Distributed data processing networks and the LANs within those distributed networks can often benefit from caching. Typically, links between LANs of a distributed processing network are slower than the interconnections between the nodes (i.e., individual computers) of a LAN. Furthermore, though a distant memory resource (e.g. a disk drive on a distant server system) may be as fast or even faster than local memory resources, long distance interconnections over a data link can dramatically slow access time to that distant resource. Regardless of the type of link between the LANs of a distributed processing network, or between the nodes (i.e., individual systems) of a LAN, each data link has a given bandwidth which will permit only a finite amount of data to be simultaneously transferred over the link. Once the bandwidth is exceeded, as for example when more than a certain number of users are attempting to communicate over the same link (whether between LANs or within a LAN), response time over that link typically degrades as each user's request is delayed in order to evenly accommodate all competing requests. Consequently, caching of data read over a network can generally increase system performance both by reducing data link loading and by providing the end user with a cache of rapidly accessible data.

Within the last several years, compact disc read-only-memory devices (CD-ROMs) have become extremely popular due to the availability of low-cost, high-capacity compact disk storage media and relatively low cost CD-ROM readers (drives). In fact, nearly all new personal computers being sold in the U.S. include an installed CD-ROM drive. Although current CD-ROM media are capable of storing approximately 450–500 megabytes of data, access to that data is considerably slower than data stored on a modern hard disk drive. For example, the current standard for a high-performance CD-ROM drive, known as a "6X" drive is capable of reading, at most, about 600 kilobytes of data per second. A modern high-speed IDE hard disk drive, on the other hand, is capable of reading about six megabytes per second—roughly ten times the speed of a 6X CD-ROM drive. Thus, CD-ROM drive performance may also be greatly enhanced through caching.

Many graphical user interface (GUI) environments, such as Microsoft® Windows™ version 3.X, Microsoft Windows 95, Windows NT®, IBM Corporation's OS/2®, and Geoworks® have been developed over the years. Of the aforementioned products, only Windows NT and OS/2 are true operating systems, as Geoworks and Windows 3.x must be loaded and run under the venerable Microsoft MSDOS operating system. Windows 95 is somewhat of a hybrid, as it also requires portions of MS-DOS for its operation. For the sake of simplicity, though, both Windows 3.X and Windows 95 are referred to hereinafter as operating systems.

As this is written, Microsoft Windows ver. 3.X is far and away the most used operating system, having been bundled with nearly every personal computer sold between 1989 and mid-1995. However, from the date of its release in 1995, the Microsoft Windows 95 operating system from Microsoft Corporation has been bundled with most new, high-performance personal computers. In less than a year, it has become the operating system of choice for most business applications, and is expected to rapidly supplant Windows 3.X as the most used operating system for personal computers. The potential exists for significantly increasing the performance of both CD-ROM drives and distributed processing networks operating under Windows 3.X and Windows 95 operating systems through caching.

SUMMARY OF THE INVENTION

Shortly after the release of Windows 95, Sun Microsystems, Inc. (hereinafter also "Sun") set about to create a network and CD-ROM caching product that runs under both Windows 3.X and Windows 95, is completely transparent to end-users, and works with a wide variety of file systems running under both Windows 3.X and Windows 95. The approach used to fulfill these requirements has been to utilize the services provided by a software program module within Windows 95 known as the Installable File System Manager (IFSMGR). Microsoft Windows 3.x and Windows 95 operating system platforms include 32-bit components, each of which runs at Ring-0 and which is called a Virtual Device Driver or VxD, for short. The IFSMGR program module is such a virtual device driver. Windows 95 is designed so that all file system input/output (I/O) requests are "hooked" to the IFSMGR VxD.

The caching product developed by Sun MicroSystems, Inc. is called "Solstice PC-CacheFS" (hereinafter "PC-Cache-FS"). The PC-CacheFS caching product, which also fits the definition of a virtual device driver, is effectively "layered" between the IFSMGR VxD and the generic file system of Windows 95.

Rather than create separate caching products for Windows 3.X and Windows 95, the PC-CacheFS caching product has been designed so that it will run under both operating systems. However, the Windows 3.X operating system has no IFSMGR virtual device driver. Thus, portions of the Windows 95 IFSMGR VxD have been rewritten to run under Windows 3.X. The rewrite is based on the IFSMGR specification provided by Microsoft Corporation. Thus, neither the PC-CacheFS caching product (VxD) nor the Windows operating systems, themselves, need be rewritten for the sake of compatibility.

DETAILED DESCRIPTION OF PREFERRED EMBODIMENTS

The embodiments of the invention described herein may be implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice that is dependent on the performance requirements of the computing system implementing the invention. Accordingly, the logical operations making up the embodiments of the invention described herein are referred to variously as operations, steps or modules.

Figure 1:
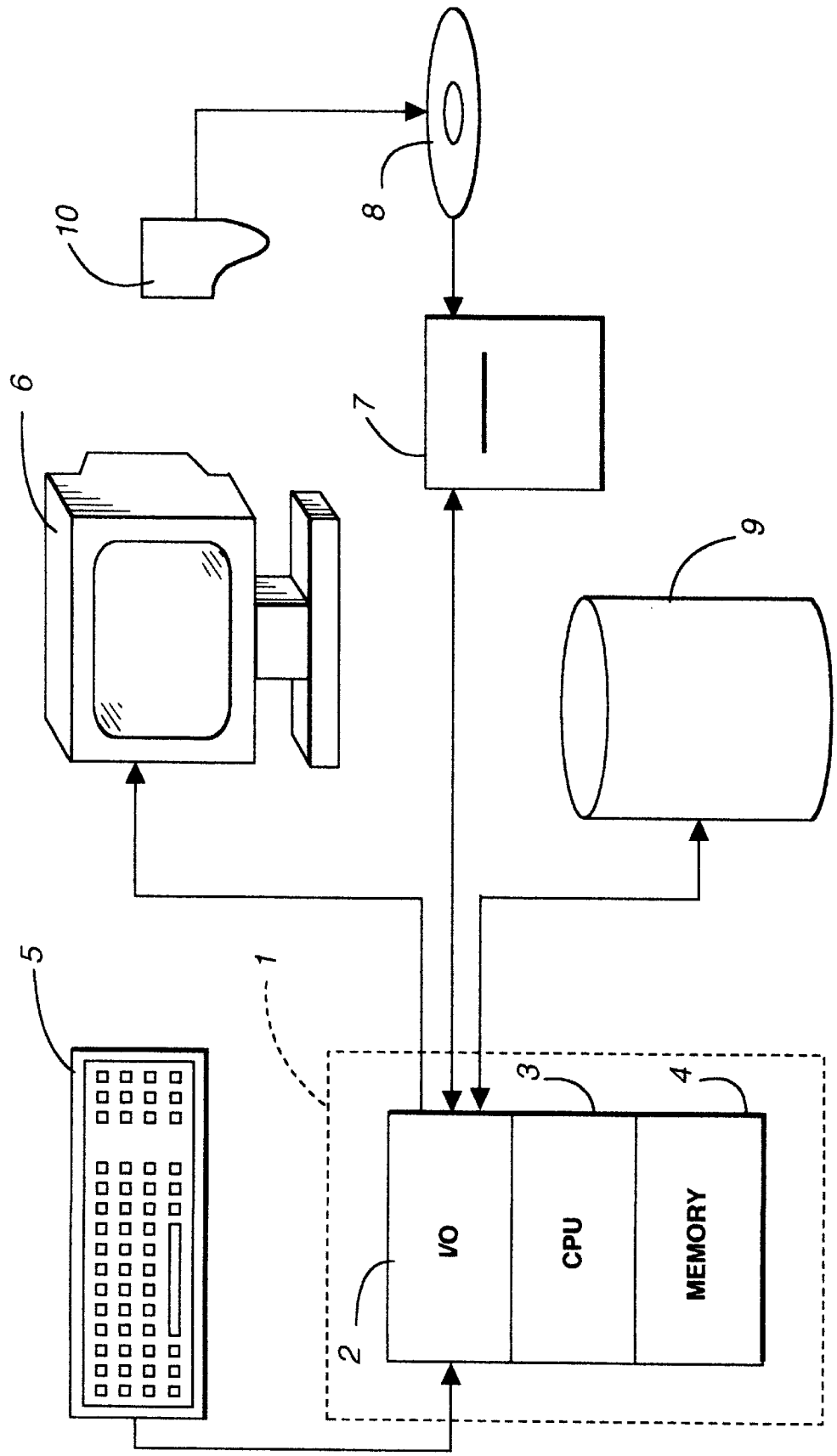
FIG. 1 illustrates a computing system for performing the computer implemented steps of the method in accordance with the invention.

The operating environment in which the present invention is used encompasses the general distributed computing system, wherein general purpose computers, workstations, or personal computers (hereinafter local nodes) are connected via communication links of various types, in a client-server arrangement, wherein programs and data, many in the form of objects, are made available by various members of the system. Some of the elements of a general purpose workstation computer are shown in FIG. 1, wherein a processor 1 is shown, the processor having an input/output (I/O) section 2, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC systems offered by Sun MicroSystems, Inc., personal computers offered by IBM Corporation and by other manufacturers of IBM-compatible personal computers, and systems running the UNIX operating system.

The preferred embodiment of the present invention provides caching for information stored on local CD-ROM drives and for information stored at non-local network resources, which may include both local and distant server system disk drives and the like. Such caching functions are provided in a single caching product which may be loaded under either Windows 3.X or Windows 95. The caching product functions such that it is completely transparent to end-users, and works with a wide variety of file systems running under both Windows 3.X and Windows 95.

The heretofore enumerated functions of the preferred embodiment are provided in the form of what Microsoft Corporation calls a virtual device driver, or VxD for short. This caching VxD interfaces with another virtual device driver called the Installable File system Manager (IFSMGR, for short) that is supplied with Windows 95. Windows 95 is designed so that all file system input/output (I/O) requests are "hooked" to the IFSMGR VxD. In a preferred embodiment of the invention, the caching VxD is layered between the IFSMGR VxD and the generic file system of Windows 95. In a preferred embodiment of the invention, the caching product receives all file system I/O requests from the IFSMGR VxD and implements a caching scheme in accordance with set-up instructions which have been pre-programmed by the user of a local node. In other words, the user tells the caching product which network or CD-ROM drive(s) are to be cached.

Rather than create separate caching products for Windows 3.X and Windows 95, the PC-CacheFS caching product has been designed so that it will run under both operating systems. However, as the Windows 3.X operating system has neither an IFSMGR virtual device driver nor a functional equivalent, a special IFSMGR virtual device driver has been incorporated in the caching VxD. Thus, when the preferred embodiment of the caching product is loaded under Windows 3.X, this special IFSMGR VxD is called whenever a system I/O request is issued by the system CPU. The special IFSMGR VxD, which is largely based on the Windows 95 IFSMGR specification provided by Microsoft Corporation, includes modifications which permit it to operate under Windows 3.X. By using this approach, neither the caching VxD nor the Windows operating systems, themselves, need be rewritten for the sake of compatibility.

The interface of the caching VxD with the IFSMGR VxD is implemented by the following exemplary, pseudo-code routine:

1. Is this Windows boot-time initialization?
   Yes: Goto Step.2.
   No: Goto Step 3.
2. "Hook" the IFSMGR service by calling the IFSMgr_InstallFileSystemApiHook routine, specifying CacheHook as the callback name for the Hook to the caching product.
3. The IFSMGR calls CacheHook with a file I/O request.
4. Does this request involve a network drive or CD-ROM drive that has been configured for caching?
   Yes: Goto Step 6.
   No: Go to Step 5, as the request is of no further interest.
5. Control returned to IFSMGR VxD and the file I/O request is chained to the next IFSMGR hook, or to the IFSMGR itself.
6. Does the local hard disk cache have valid data in it to satisfy this request?
   Yes: Goto Step 9.
   No: Goto Step 7.
7. Call down to the network or CD-ROM file system and retrieve at least enough data to satisfy the request, retaining control from the IFSMGR.
8. Cache the retrieved data by saving it either in random-access memory or on the local hard disk for subsequent retrieval.
9. Provide data from the cache which resolves the I/O request, and go to Step 5.

Figure 2:
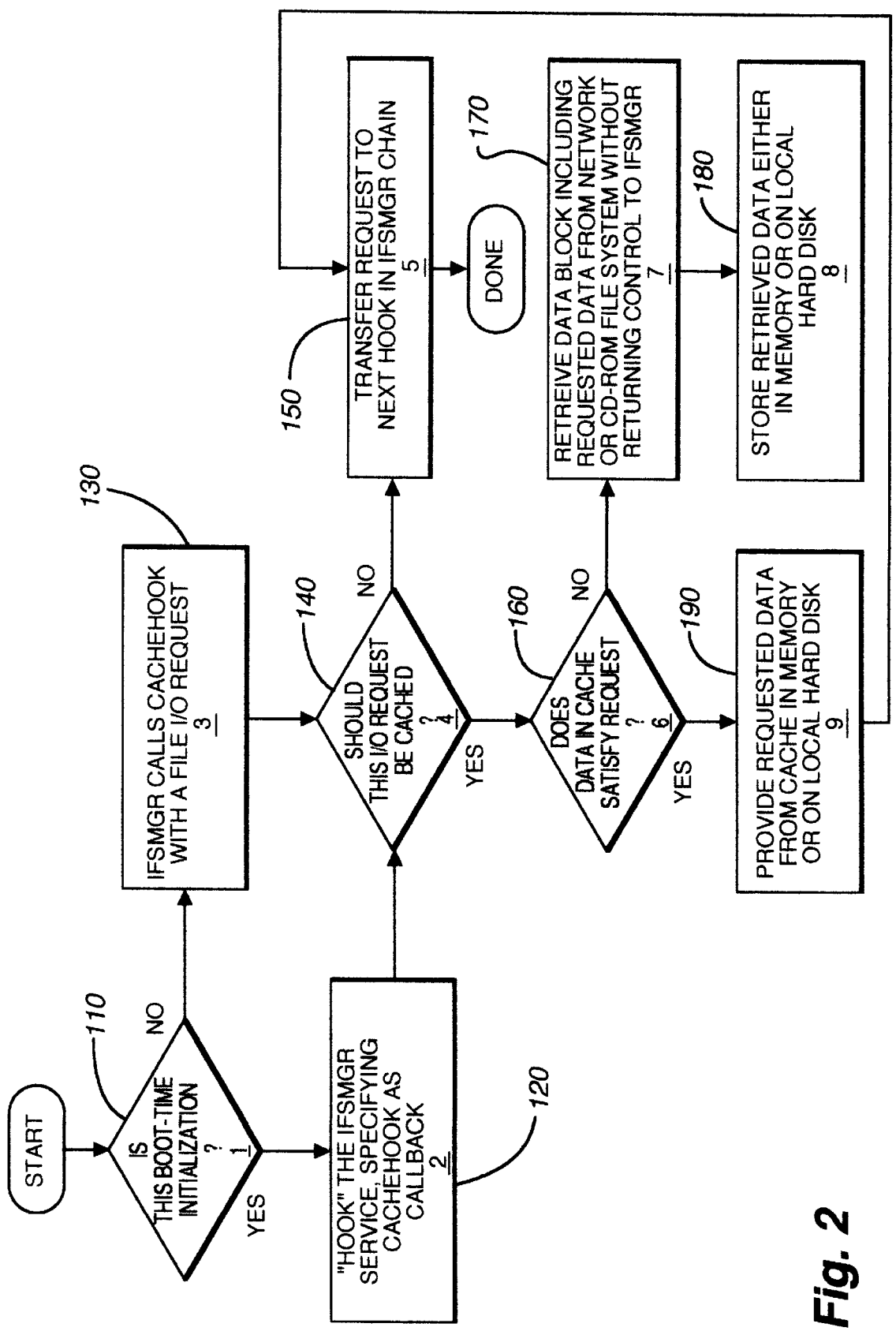
FIG. 2 is a flow chart depicting the logical operation of the caching virtual device driver.

In order to further clarify the operational flow of the caching VxD, the foregoing pseudo-code routine has been formatted in the flow chart of FIG. 2.

Any virtual device driver may monitor all system file I/O requests by establishing a hook to the IFSMGR VxD. This is accomplished by calling a routine within the IFSMGR VxD called "IFSMgr_InstallFileSystemApiHook" and providing it with a unique callback name. In this case, the name "CacheHook" has been arbitrarily chosen as the callback name for the caching VxD.

The IFSMGR VxD retains a table of all hook requests made by various virtual device drivers. For example, in addition to the caching VxD, a virus scanning VxD may also have a hook to the IFSMGR VxD. Such a virus scanning VxD may be responsible for scanning all executable files for viruses as they are being read. All IFSMGR hooks are chained together. In order to initiate the chaining sequence, the IFSMGR VxD passes an incoming file I/O request to the first hook along with information which sequentially identifies all other requesting hooks. Each hook analyzes the incoming file I/O request and decides, on the basis of the type of request, whether or not to take action. When each hook finishes with the incoming file I/O request, it passes ("chains") the request to the next hook in the sequence. The final hook in the sequence returns control of the file I/O request to the IFSMGR VxD.

The cache may be established in either the local systems random access memory or on the local hard-disk drive. Alternatively, a two-tier caching system may be implemented such that a large block of non-volatile cached data resides on the local hard-disk drive, while a smaller block of volatile cached data resides within a portion of the random access memory. Such caching schemes are already well known in the art and will not be discusses herein in greater detail.

While the invention has been particularly shown and described with reference to a preferred embodiment thereof, it will be understood by those skilled in the art that various other changes in the form and details may be made therein without departing from the spirit and scope of the invention.

What is claimed is:

1. A method encoded in the form of binary program instructions for implementing a caching virtual device driver responsive to file I/O requests within a Microsoft Windows operating system, said operating system being provided with a virtual device driver (VxD) identified as the Installable File System Manager (IFSMGR), said method implemented on a local node computer system of a networked data processing system having at least one server computer system, said local node having a central processing unit (CPU), random access memory, a local data bus, and at least one local mass storage device on which data can be alterably stored, said server system having at least one mass storage device on which data can be alterably stored, said method comprising the steps of:

providing for establishing a hook to the IFSMGR VxD at boot time initialization of the Windows operating system;

providing for receiving a call from the IFSMGR VxD whenever the local node system processes a file I/O request;

providing for assuming control of the request determining whether or not each request involves data on a mass storage device that has been configured by the user for caching;

providing for returning control of the request to the IFSMGR VxD if a request does not involve data on a mass storage device that has not been configured for caching;

if a request does involve data on a mass storage device that has been configured for caching, then providing for determining whether or not data which satisfies the request resides within an established cache at the local node;

if data which satisfies the request resides within the established cache, then providing for supplying that data to the local data bus, and returning control of the request to the IFSMGR VxD; and if no data which satisfies the request resides within the established cache, then providing for retrieving a block of data, which includes the data which satisfies the request, from the server system's mass-storage device, storing the retrieved block in the cache, and supplying the data which satisfies the request to the local data bus, and returning control of the request to the IFSMGR VxD.

2. A method implementing a caching virtual device driver responsive to file I/O requests within a windows based operating system, said operating system being provided with a virtual device driver (VxD) identified as an Installable File System Manager (IFSMGR), said method implemented on a data processing system having a random access memory, a data bus, and a first mass storage device on which data can be alterably stored, said data processing system being coupled to at least a second mass storage device from which data is to be cached, said method comprising the steps of:

providing for establishing a hook to the IFSMGR VxD at boot time initialization of the Windows operating system;

providing for receiving a call from the IFSMGR VxD whenever the system processes a file I/O request;

providing for assuming control of the request and determining whether or not each request involves data on the second mass storage device;

providing for returning control of the request to the IFSMGR VxD if a request does not involve data on the second mass storage device;

if a request does involve data on the second mass storage device, then providing for determining whether or not data which satisfies the request resides within a cache established on the data processing system;

if data which satisfies the request resides within the established cache, then providing for supplying that data to the data bus, and returning control of the request to the IFSMGR VxD; and if no data which satisfies the request resides within the established cache, then providing for retrieving a block of data, which includes the data which satisfies the request, from the second mass-storage device, storing the retrieved block in the established cache, and supplying the data which satisfies the request to the data bus, and returning control of the request to the IFSMGR VxD.

3. The method of claim 2, wherein the second mass-storage device is a CD-ROM drive.

4. The method of claim 2, wherein the second mass-storage device is located on a server computer system to which the data processing system is coupled via a network link.

5. The method of claim 2, wherein said cache is established within the random access memory.

6. The method of claim 2, wherein said cache is established on the first mass-storage device.

7. The method of claim 2, wherein said cache is established in both the random access memory and on the first mass-storage device.

8. A computer program storage medium encoding a program of instructions for a process for implementing a caching system responsive to file I/O requests within a Microsoft Windows operating system, said operating system being provided with a virtual device driver (VxD) identified as the Installable File System Manager (IFSMGR), said process implemented on a data processing system having a random access memory, a data bus, and a first mass storage device on which data can be alterably stored, said data processing system being coupled to at least a second mass storage device from which data is to be cached, said instructions being readable and executable by a computer system, said process comprising the steps of:

providing for establishing a hook to the IFSMGR VxD at boot time initialization of the Windows operating system;

providing for receiving a call from the IFSMGR VxD whenever the system processes a file I/O request;

providing for assuming control of the request and determining whether or not each request involves data on the second mass storage device;

providing for returning control of the request to the IFSMGR VxD if a request does not involve data on the second mass storage device;

if a request does involve data on the second mass storage device, then providing for determining whether or not data which satisfies the request resides within a cache established on the data processing system;

if data which satisfies the request resides within the established cache, then providing for supplying that data to the data bus, and returning control of the request to the IFSMGR VxD; and if no data which satisfies the request resides within the established cache, then providing for retrieving a block of data, which includes the data which satisfies the request, from the second mass-storage device, storing the retrieved block in the established cache, and supplying the data which satisfies the request to the data bus, and returning control of the request to the IFSMGR VxD.

9. The method of claim 8, wherein the second mass-storage device is a CD-ROM drive.

10. The method of claim 8, wherein the second mass-storage device is located on a server computer system to which the data processing system is coupled via a network link.

11. The method of claim 8, wherein said cache is established within the random access memory.

12. The method of claim 8, wherein said cache is established on the first mass-storage device.

13. A computer implemented process for implementing a caching system responsive to file I/O requests within a windows-based operating system, said operating system being provided with a virtual device driver (VxD) identified as an Installable File System Manager (IFSMGR), said process implemented on a data processing system having a random access memory, a data bus, and a first mass storage device on which data can be alterably stored, said data processing system being coupled to at least a second mass storage device from which data is to be cached, said process comprising the steps of:

providing for establishing a hook to the IFSMGR VxD at boot time initialization of the Windows operating system;

providing for receiving a call from the IFSMGR VxD whenever the system processes a file I/O request;

providing for assuming control of the request and determining whether or not each request involves data on the second mass storage device;

providing for returning control of the request to the IFSMGR VxD if a request does not involve data on the second mass storage device;

if a request does involve data on the second mass storage device, then providing for determining whether or not data which satisfies the request resides within a cache established on the data processing system;

if data which satisfies the request resides within the established cache, then providing for supplying that data to the data bus, and returning control of the request to the IFSMGR VxD; and if no data which satisfies the request resides within the established cache, then providing for retrieving a block of data, which includes the data which satisfies the request, from the second mass-storage device, storing the retrieved block in the established cache, and supplying the data which satisfies the request to the data bus, and returning control of the request to the IFSMGR VxD.

14. The method of claim 13, wherein the second mass-storage device is a CD-ROM drive.

15. The method of claim 13, wherein the second mass-storage device is located on a server computer system to which the data processing system is coupled via a network link.

16. The method of claim 13, wherein said cache is established within the random access memory.

17. A method for implementing a caching virtual device driver responsive to I/O requests within a windows based operating system which is provided with a virtual device driver (VxD), said method implemented on a local node computer system of a networked computer system having a server computer, said local node having a central processing unit (CPU), random access memory, a local data bus, and at least one local mass storage device on which data can be alterably stored, said server system having at least one mass storage device on which data can be alterably stored, comprising the steps of:

establishing a hook to the VxD at boot time initialization of the operating system;

receiving a call from the VxD whenever the local node system processes a I/O request;

assuming control of the request determining whether or not each request involves data on a mass storage device that has been configured by the user for caching;

returning control of the request to the VxD if a request does not involve data on a mass storage device that has not been configured for caching;

if a request does involve data on a mass storage device that has been configured for caching, then determining whether or not data which satisfies the request resides within an established cache at the local node;

if data which satisfies the request resides within the established cache, then supplying that data to the local data bus, and returning control of the request to the VxD; and if no data which satisfies the request resides within the established cache, then retrieving a block of data, which includes the data which satisfies the request, from the mass-storage device of the server system, storing the retrieved block in the cache, and supplying the data which satisfies the request to the local data bus, and returning control of the request to the VxD.

* * * * *